United States Patent
Vincent

(10) Patent No.: US 11,238,450 B2
(45) Date of Patent: Feb. 1, 2022

(54) COMPUTER-IMPLEMENTED SYSTEMS AND METHODS TO ENABLE COMPLEX FUNCTIONALITY ON A BLOCKCHAIN WHILE PRESERVING SECURITY-BASED RESTRICTIONS ON SCRIPT SIZE AND OPCODE LIMITS

(71) Applicant: nChain Licensing AG, Zug (CH)

(72) Inventor: Stephane Vincent, Luxembourg (LU)

(73) Assignee: nChain Licensing AG, Zug (CH)

( * ) Notice: Subject to any disclaimer, the term of this patent is extended or adjusted under 35 U.S.C. 154(b) by 367 days.

(21) Appl. No.: 16/472,170

(22) PCT Filed: Dec. 15, 2017

(86) PCT No.: PCT/IB2017/058007
§ 371 (c)(1),
(2) Date: Jun. 20, 2019

(87) PCT Pub. No.: WO2018/116104
PCT Pub. Date: Jun. 28, 2018

(65) Prior Publication Data
US 2019/0356467 A1  Nov. 21, 2019

(30) Foreign Application Priority Data

Dec. 21, 2016  (GB) .................................... 1621827
Dec. 21, 2016  (GB) .................................... 1621830
Dec. 21, 2016  (GB) .................................... 1621831

(51) Int. Cl.
*G06Q 20/40* (2012.01)
*G06F 9/46* (2006.01)
(Continued)

(52) U.S. Cl.
CPC ........... *G06Q 20/401* (2013.01); *G06F 9/466* (2013.01); *G06Q 20/065* (2013.01);
(Continued)

(58) Field of Classification Search
CPC .. G06Q 20/401; G06Q 20/389; G06Q 20/065; G06F 9/466; H04L 9/3239;
(Continued)

(56) References Cited

U.S. PATENT DOCUMENTS 10,838,846 B1   11/2020  Saleh-Esa
2015/0324789 A1  11/2015  Dvorak et al.
(Continued)

FOREIGN PATENT DOCUMENTS

CN   106503053 A      3/2017
WO   2015171580 A1   11/2015
WO   2016127721 A1    8/2016

OTHER PUBLICATIONS

Antonopoulos, "Mastering Bitcoin—Unlocking Digital Cryptocurrencies," O'Reilly Media, Inc., Dec. 20, 2014, 282 pages.
(Continued)

*Primary Examiner* — Matthew Smithers
*Assistant Examiner* — Mirza Israr Javed
(74) *Attorney, Agent, or Firm* — Davis Wright Tremaine LLP

(57) ABSTRACT

The invention relates to blockchain technologies such as the Bitcoin blockchain. The invention uses a novel technique to decompose the functionality of a blockchain transaction script into several chunks or functional parts, and to use the output of a chunk as the input of the next chunk. Advantageously, this allows the blockchain to be used for ever complex tasks and computations while minimising script size, and also provides a novel architecture for the distributed execution of computational processes. The invention comprises a method of using a plurality of blockchain transactions to execute a computer-implemented task, comprising the steps: using an unlocking script (ULS1) associated with a first input (In1) in a blockchain transaction (Tx2)
(Continued)

Chain of transaction for Embodiment 1 example to present at least one data item to a locking script (LS1) of another transaction (Tx1) so as to provide a result on a stack; amending the blockchain transaction (Tx2) to include a second input (In2); generating a further unlocking script (ULS2) associated with the second input (In2), the further unlocking script (ULS2) comprising the result from the stack; and presenting the further unlocking script (ULS2) to a further locking script (LS2) such that the result from the stack is provided as input to the further locking script (LS2). Preferably, the locking script (LS1) and the further locking script (LS2) are provided in association with different outputs within the same blockchain transaction (Tx1).

20 Claims, 11 Drawing Sheets

(51) Int. Cl.
  G06Q 20/06      (2012.01)
  H04L 9/06       (2006.01)
  H04L 9/32       (2006.01)
  G06Q 20/38      (2012.01)
(52) U.S. Cl.
  CPC ............ G06Q 20/389 (2013.01); H04L 9/06 (2013.01); H04L 9/0643 (2013.01); H04L 9/3239 (2013.01); H04L 9/3247 (2013.01); H04L 2209/38 (2013.01); H04L 2209/56 (2013.01)
(58) Field of Classification Search
  CPC ....... H04L 9/0643; H04L 9/3247; H04L 9/06; H04L 2209/38; H04L 2209/56
  See application file for complete search history.

(56) References Cited

U.S. PATENT DOCUMENTS

| | | | |
|---|---|---|---|
| 2016/0085955 A1 | 3/2016 | Lerner | |
| 2016/0260095 A1 | 9/2016 | Ford | |
| 2016/0292672 A1 | 10/2016 | Fay et al. | |
| 2017/0005804 A1 | 1/2017 | Zinder | |
| 2017/0187535 A1 | 6/2017 | Middleton et al. | |
| 2017/0287090 A1 | 10/2017 | Hunn et al. | |
| 2017/0317997 A1* | 11/2017 | Smith | H04L 9/3271 |
| 2018/0253724 A1 | 9/2018 | Smith et al. | |
| 2019/0080392 A1* | 3/2019 | Youb | G06F 21/64 |
| 2019/0121988 A1* | 4/2019 | van de Ruit | H04L 9/0825 |
| 2019/0280861 A1 | 9/2019 | Smith et al. | |
| 2019/0356641 A1 | 11/2019 | Isaacson et al. | |
| 2019/0378119 A1 | 12/2019 | Hyuga et al. | |
| 2020/0177377 A1 | 6/2020 | Smith et al. | |

OTHER PUBLICATIONS

Decker et al., "Bitcoin Transaction Malleability and MtGox," European Symposium on Research in Computer Security, Sep. 6, 2014, 13 pages.
Guyot-Sionnest et al., "bitcoin-abe," GitHub, https://github.com/bitcoin-abe/bitcoin-abe/blob/master/README-MYSQL.txt, Nov. 28, 2016 [retrieved Feb. 24, 2017], 3 pages.
International Search Report and Written Opinion dated Mar. 1, 2018, Patent Application No. PCT/IB2017/058009, 11 pages.
International Search Report and Written Opinion dated Mar. 15, 2018, Patent Application No. PCT/IB2017/058007, 11 pages.
International Search Report and Written Opinion dated Mar. 15, 2018, Patent Application No. PCT/IB2017/058008, 11 pages.
International Search Report and Written Opinion dated May 30, 2018, Patent Application No. PCT/IB2018/050516, 17 pages.
Maksim et al., "Toshi," GitHub, https://github.com/coinbase/toshi, Oct. 29, 2016 [retrieved Feb. 24, 2017], 4 pages.
Maxwell, "Re: [Bitcoin-development] BIP 65 and OP_CHECKLOCKTIMEVERIFY inquiry . . . ," The Mail Archive, Nov. 27, 2014 [retrieved Mar. 27, 2017], https://www.mail-archive.eom/bitcoindevelopment@lists.sourceforge.net/msg06536.html, 3 pages.
Pacia et al., "OpenBazaar—Ratings, Reviews, and Reputation," Jul. 9, 2015, http://www.slideshare.net/drwasho/openbazaar-ratings-reviews-and-reputation?from_m_app=android, 82 pages.
Pass et al., "Micropayments for Decentralized Currencies," Proceedings of the 22nd ACM SIGSAC Conference on Computer and Communications Security, Feb. 18, 2016 version (first disclosed Oct. 12, 2015), 31 pages.
Seijas et al., "Scripting smart contracts for distributed ledger technology," Cryptology ePrint Archive, Report 2016/1156, Dec. 16, 2016, 30 pages.
UK Commercial Search Report dated Apr. 5, 2017, Patent Application No. GB1621827.3, 5 pages.
UK Commercial Search Report dated Apr. 5, 2017, Patent Application No. GB 1621830.7, 5 pages.
UK Commercial Search Report dated Apr. 5, 2017, Patent Application No. GB 1621831.5, 5 pages.
UK Commercial Search Report dated Mar. 2, 2017, Patent Application No. GB1701589.2, 5 pages.
UK IPO Search Report dated Jul. 19, 2017, Patent Application No. GB1701589.2, 5 pages.
UK IPO Search Report dated Jul. 3, 2017, Patent Application No. GB1621831.5, pages.
UK IPO Search Report dated Jun. 30, 2017, Patent Application No. GB1621827.3, 3 pages.
UK IPO Search Report dated Jun. 30, 2017, Patent Application No. GB1621830.7, 4 pages.
Vey, "The Value Chain Applied to the UK's Independent Film Industry," Department of Computing Imperial College London Masters of Engineering in Computing (Artificial Intelligence) Thesis, Jun. 2016, http://www.imperial.ac.uk/media/imperial-college/faculty-ofengineering/computing/public/AlanVey.pdf, 141 pages.
Wijaya, "Extending asset management system functionality in bitcoin platform", 2016 International Conference on Computer, Control, Informatics and its Applications (IC3INA), Oct. 3, 2016, 5 pages.
Wuille, "Re: [Bitcoin-development] Alternative to OP EVAL," The Mail Archive, Dec. 29, 2011 [retrieved Mar. 27, 2017], https://www.mail-archive.com/bitcoindevelopment@lists.sourceforge.net/msg00611.html, 3 pages.
Nakamoto, "Bitcoin: A Peer-to-Peer Electronic Cash System," Bitcoin, Oct. 31, 2008, https://bitcoin.org/bitcoin.pdf, 9 pages.
Underwood, "Blockchain Beyond Bitcoin," Communications of the ACM 59(11):15-17, Oct. 2016.

* cited by examiner

Figure 1: Chain of transaction for Embodiment 1 example
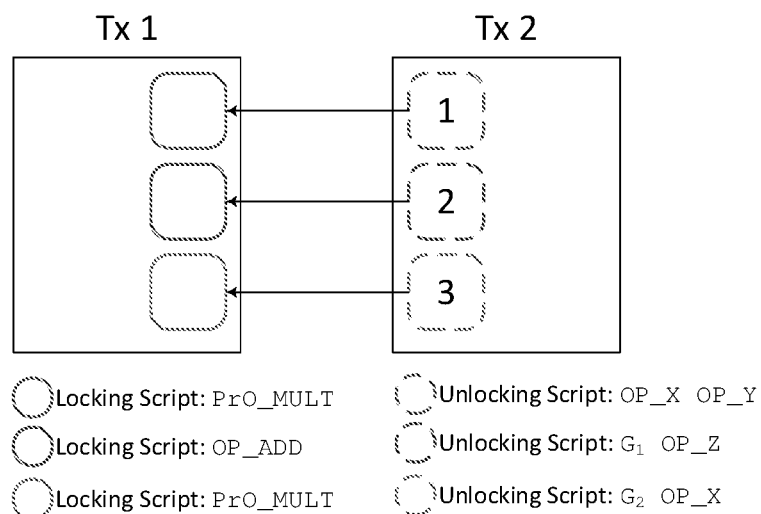

Figure 2: Transaction 1 Tx1 (embodiment 1)

| Transaction 1 | |
|---|---|
| 01 | Transaction-ID |
| Version Number | Version number |
| 01 | Number of inputs |
| Previous Tx | Prev Trans Output |
| 00 | Prev Trans Output index |
| Script length | Script length |
| <Alice's signature> <Alice's public key> | ScriptSig |
| SIGHASH_ALL | ScriptSig |
| Sequence number | Sequence number |
| 03 | Number of Outputs |
| Few satoshis | Output value |
| Output Script Length | Output script length |
| OP_HASH160 <hash160(redeem script 1)> OP_EQUAL | Output script |
| Few satoshis | Output value |
| Output Script Length | Output script length |
| OP_HASH160 <hash160(redeem script 2)> OP_EQUAL | Output script |
| Few satoshis | Output value |
| Output Script Length | Output script length |
| OP_HASH160 <hash160(redeem script 3)> OP_EQUAL | Output script |
| LockTime | LockTime |

| | |
|---|---|
| Pro_MULT OP_SWAP <Bob's public key> OP_CHECKSIG | Redeem script 1 |
| OP_ADD OP_SWAP <Bob's public key> OP_CHECKSIG | Redeem script 2 |
| Pro_MULT OP_SWAP <Bob's public key> OP_CHECKSIG | Redeem script 3 |

Figure 3: Transaction 2 Tx2 (embodiment 1)

| Transaction 2 | |
|---|---|
| 02 | Transaction-ID |
| Version Number | Version number |
| 03 | Number of inputs |
| 01 | Prev Trans Output |
| 00 | Prev Trans Output index |
| Script length | Script length |
| <Bob's signature> OP_X OP_Y <Redeem script 1> | ScriptSig |
| SIGHASH_NONE\|SIGHASH_ANYONECANPAY | ScriptSig |
| 01 | Prev Trans Output |
| 01 | Prev Trans Output index |
| Script length | Script length |
| <Bob's signature> $G_1$ OP_Z <Redeem script 2> | ScriptSig |
| SIGHASH_NONE\|SIGHASH_ANYONECANPAY | ScriptSig |
| 01 | Prev Trans Output |
| 02 | Prev Trans Output index |
| Script length | Script length |
| <Bob's signature> $G_2$ OP_X <Redeem script 3> | ScriptSig |
| SIGHASH_ALL | ScriptSig |
| Sequence number | Sequence number |
| 01 | Number of Outputs |
| Few satoshis | Output value |
| Output Script Length | Output script length |
| OP_DUP HASH160 <hash160(Bob's public key)> OP_EQUALVERIFY OP_CHECKSIG | Output script |
| LockTime | LockTime |

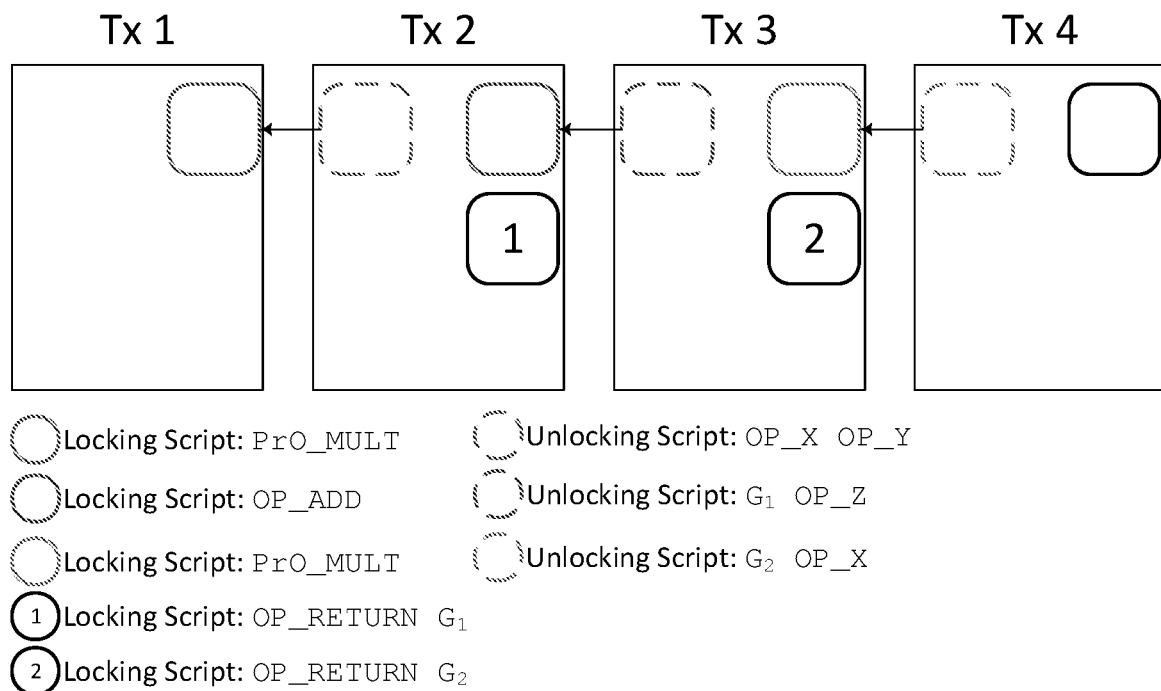
Figure 4: Chain of transactions according to embodiment 2

Figure 5: Transaction 1 of embodiment 2

| Transaction 1 | |
|---|---|
| 01 | Transaction-ID |
| Version Number | Version number |
| 01 | Number of inputs |
| Previous Tx | Prev Trans Output |
| 00 | Prev Trans Output index |
| Script length | Script length |
| <Alice's signature> <Alice's public key> | ScriptSig |
| SIGHASH_ALL | ScriptSig |
| Sequence number | Sequence number |
| 01 | Number of Outputs |
| 4BTC | Output value |
| Output Script Length | Output script length |
| OP_HASH160 <hash160(redeem script 1)> OP_EQUAL | Output script |
| LockTime | LockTime |

Figure 6: Transaction 2 of embodiment 2

| Transaction 2 | |
|---|---|
| 02 | Transaction-ID |
| Version Number | Version number |
| 01 | Number of inputs |
| 01 | Prev Trans Output |
| 00 | Prev Trans Output index |
| Script length | Script length |
| <Bob's signature> OP_X OP_Y <Redeem script 1> | ScriptSig |
| SIGHASH_ALL | ScriptSig |
| Sequence number | Sequence number |
| 02 | Number of Outputs |
| 3BTC | Output value |
| Output Script Length | Output script length |
| OP_HASH160 <hash160(redeem script 2)> OP_EQUAL | Output script |
| 0.98BTC | Output value |
| Output Script Length | Output script length |
| OP_RETURN $G_1$ | Output script |
| LockTime | LockTime |

Figure 7: Transaction 3 of embodiment 2

| Transaction 3 | |
|---|---|
| 03 | Transaction-ID |
| Version Number | Version number |
| 01 | Number of inputs |
| 02 | Prev Trans Output |
| 00 | Prev Trans Output index |
| Script length | Script length |
| <Bob's signature> $G_1$ OP_Z <Redeem script 2> | ScriptSig |
| SIGHASH_ALL | ScriptSig |
| Sequence number | Sequence number |
| 02 | Number of Outputs |
| 2BTC | Output value |
| Output Script Length | Output script length |
| OP_HASH160 <hash160(redeem script 3)> OP_EQUAL | Output script |
| 0.98BTC | Output value |
| Output Script Length | Output script length |
| OP_RETURN $G_2$ | Output script |
| LockTime | LockTime |

Figure 8: Transaction 4 of embodiment 2

| Transaction 4 | |
|---|---|
| 04 | Transaction-ID |
| Version Number | Version number |
| 01 | Number of inputs |
| 03 | Prev Trans Output |
| 00 | Prev Trans Output index |
| Script length | Script length |
| <Bob's signature> $G_2$ OP_X <Redeem script 3> | ScriptSig |
| SIGHASH_ALL | ScriptSig |
| Sequence number | Sequence number |
| 01 | Number of Outputs |
| 1.08BTC | Output value |
| Output Script Length | Output script length |
| OP_DUP HASH160 <hash160(Bob's public key)> OP_EQUALVERIFY OP_CHECKSIG | Output script |
| LockTime | LockTime |

Figure 9a – Illustration of Embodiment 1 example
Locking Script: $f : x,y,z \rightarrow (x \cdot y + z) \cdot x$
$g_1(x,y) = x \cdot y$
$g_2(g_1,z) = g_1 + z$
$f(g_2, x) = g2 \cdot x$
1st Unlocking Script: OP_X    OP_Y
2nd Unlocking Script: $g_1$    OP_Z
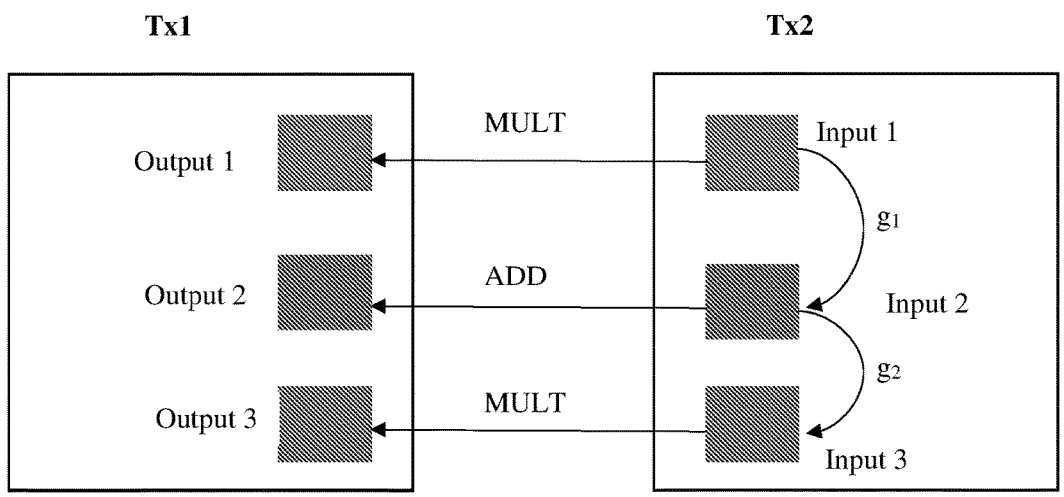
Locking scripts incorporate functionality:
    Multiplication (MULT)
    Addition (ADD)
    Multiplication (MULT)

Figure 9b – Further Illustration of Embodiment 1 example

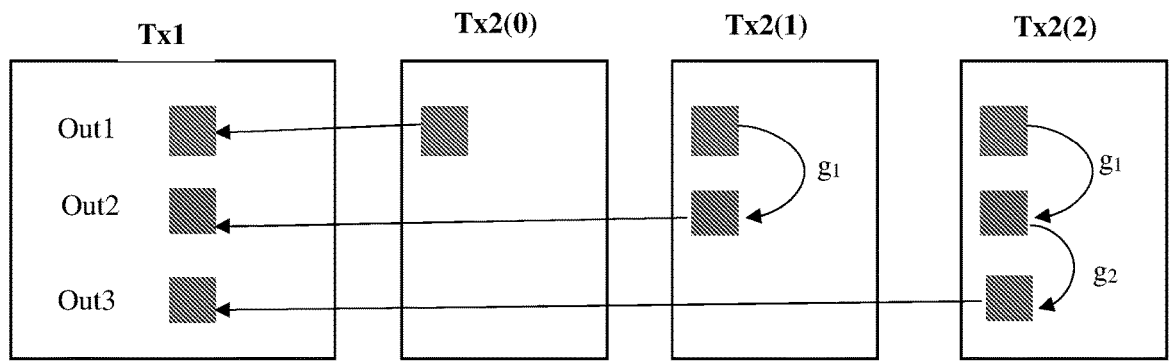

Phase 0: Prepare initial version of Tx2 – we will call this Tx2(0) in figure above; unlocking script of input 1 in Tx2(0) presents the arguments (OP_X and OP_Y) to the locking script of Output 1 in Tx1;
validate Tx2(0) – produces a result g1 which is left on the stack;

Phase 1: Update Tx2 to include input 2 (we will call this updated version Tx2(1));
validate Tx2(1) using results $g_1$ produced by output 1 in phase 0

Phase 2: Update Tx2 to include input 3 (we will call this updated version Tx2(2));
validate Tx2(2) using results $g_1$ and $g_2$ Phase 3: Submit Tx(2) to the blockchain

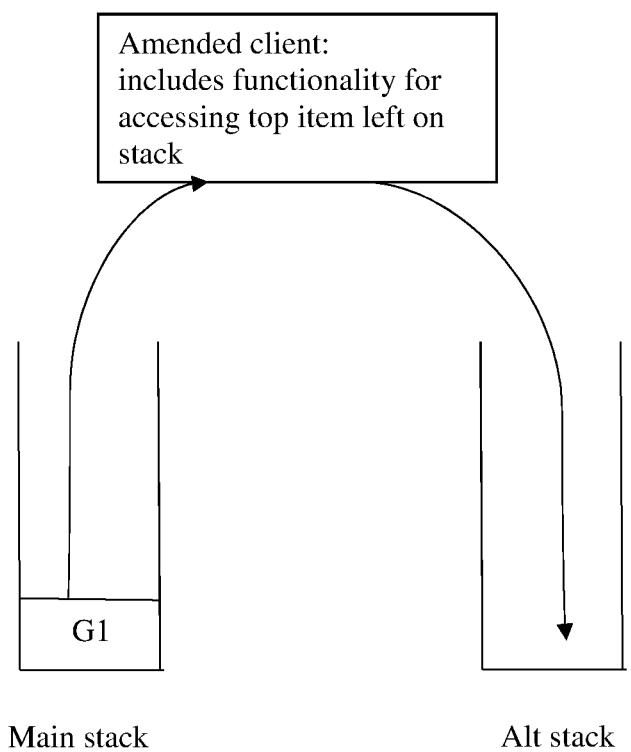
Figure 10 – Accessing the stack

COMPUTER-IMPLEMENTED SYSTEMS AND METHODS TO ENABLE COMPLEX FUNCTIONALITY ON A BLOCKCHAIN WHILE PRESERVING SECURITY-BASED RESTRICTIONS ON SCRIPT SIZE AND OPCODE LIMITS

This invention relates generally to blockchain technology, and more particularly to implementing complex functionality via the blockchain. Advantageously, the invention allows for the outcome of a computation or executed code to be transferred one to the other, providing a mechanism which uses blockchain transactions as a control mechanism for enabling, influencing and directing the activities of a computer-implemented process. The invention is particularly suited for, but not limited to, the implementation and control of automated processes.

In this document we use the term 'blockchain' to include all forms of electronic, computer-based distributed ledgers, including, but not limited to blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions. Each transaction includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language. Scripts are made up of instructions (opcodes) which push data items onto the stack, or pop them off the stack.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc) while being more versatile in their applications.

One area of current research is the use of the blockchain for the implementation of "smart contracts"—machine executable programs which act upon the conditions set out in machine-readable documents and comprise rules that can process inputs in order to produce results, which can then cause actions to be performed dependent upon those results.

However, as more and more sophisticated applications are devised for blockchain technology, so the need for ever-increasingly complex script functionality rises as well. A technical problem arises here, though, as blockchain technologies are purposefully designed to restrict and limit what can be legitimately achieved within a script. For example, due to security considerations, the Bitcoin Script language is deliberately non-Turing complete. Furthermore, an upper limit of 200 op-codes is imposed per script so as to prevent Denial of Service attacks. As long as a Bitcoin transaction script contains fewer than 200 op_codes, it can be validated and broadcasted. However, with the advent of more sophisticated program elements (e.g. primitives), this limit places a restriction on the development of more complex technical solutions for applications such as smart contract execution.

Thus, a technical solution is required which enables complex functionality to be built into blockchain scripts without compromising security and/or requiring any adaptation of the existing protocol. Preferably, this solution would allow the capabilities of existing blockchain protocols such as the Bitcoin protocol, to enable the infrastructure to be used in novel and advantageous ways by using blockchain transactions and the stack to extend the computational abilities of the blockchain beyond its present limits. Such a technique would enable the use of transactions to control, influence and direct the execution of a technical process.

Such a solution has now been devised. The invention provides at least the advantages described herein.

The present invention is defined in the appended claims.

Therefore, in accordance with the invention there may be provided a method and/or corresponding system.

According to one perspective, the invention may be viewed as providing a technique and corresponding implementation which enables complex functions to be performed via the use of a blockchain. Advantageously, this technique may use a combination of a variety of distinct computing components to perform the specified function. These may comprise one or more software-based clients, at least one storage resource (preferably a stack-based data structure), at least one digital wallet executing on at least one processor and arranged to generate a blockchain transaction, and/or a blockchain. Preferably, this may be the Bitcoin blockchain.

Embodiments of the invention may involve the decomposition of a technical task over multiple transactions and their respective inputs and outputs. Embodiments of the invention may obtain data from at least one data storage resource and use that data to control the execution of a task or computation which is implemented over multiple blockchain transactions, in particular by passing script outputs between the respective transaction inputs and outputs.

The various system components mentioned above may be arranged so as to obtain and pass data items between the components so as to enable computations and tasks to be performed via the blockchain transactions. These computations/tasks can be lengthy and complex, and could not be performed via blockchain transactions prior to the present invention, possibly due to an enforced limit on the size of the script and/or number of op_codes used therein.

Once the transactions are on the blockchain, they are recorded in an immutable and permanent manner. Therefore, from one perspective the invention provides an improved blockchain protocol, improved blockchain client, an improved computational technique and corresponding apparatus, and/or an improved process control mechanism.

In one sense, the invention enables complex computations to be performed via a blockchain protocol while still preserving the security-based restrictions on script size and opcode limits. Prior to the invention, such lengthy computations would either be impossible using, for example, the current Bitcoin protocol or one would have to use an alternative form of blockchain which does not include script-based restrictions. The latter is not always desirable or feasible. Thus, the invention provides an enhanced security mechanism. As it provides a means for achieving results that were hitherto not possible via the protocol, the invention provides an improved blockchain protocol.

A method in accordance with the invention may be described as a method of using a plurality of blockchain transactions to execute a computer-implemented task. Additionally or alternatively, it may be described as a method of:

controlling the execution of computer-implemented task by allocating or distributing the execution of portions of the task to locking and unlocking scripts provided in two or more respective blockchain transactions;

controlling the execution of a computer-implemented task by reading a value from a stack-based data structure and passing it as a value from an unlocking script to a locking script.

The method may comprise the steps:

using an unlocking script (ULS1) associated with a first input (In1) in a blockchain transaction (Tx2) to present at least one data item to a locking script (LS1) of another transaction (Tx1) so as to provide a result on a stack;

amending the blockchain transaction (Tx2) to include a second input (In2);

generating a further unlocking script (ULS2) associated with the second input (In2), the further unlocking script (ULS2) comprising the result from the stack; and/or presenting the further unlocking script (ULS2) to a further locking script (LS2) such that the result from the stack is provided as input to the further locking script (LS2).

The blockchain transactions may be arranged in accordance with a version of the Bitcoin protocol.

The method may further comprise the step of:

performing one or more of the steps of claim 1 more than once.

The method may further comprise the step of:

using the at least one data item in the execution of a calculation or sequence of instructions provided within the locking script (LS1).

The method may further comprise the step of:

using the result provided on the stack in the execution of a calculation or sequence of instructions provided within the further locking script (LS2).

The method may further comprise the step of obtaining the result from the stack.

The method may further comprise the step of:

validating the blockchain transaction (Tx2) and/or the other transaction (Tx1) to generate the result on the stack.

The unlocking script (ULS1) and the further unlocking script (ULS2) may be provided in association with different inputs (In1, In2) within the same blockchain transaction (Tx2). The invention may be substantially as described hereafter in respect of "embodiment 1" of the invention, and/or substantially in accordance with the technique or principles illustrated by the examples shown in FIGS. 1 to 3, 9a and 9b.

The locking script (LS1) and the further locking script (LS2) may be provided in association with different outputs within the same blockchain transaction (Tx1). Advantageously, this provides a compact and efficient solution because only two transactions are required to implement the functionality. This reduces space and storage requirements, fees, processing overheads and other disadvantages associated with the propagation of multiple transactions.

The step of presenting the further unlocking script (ULS2) to a further locking script (LS2) may provide a further result on the stack, or on a different stack. The stack may be the main stack or an alt stack.

The method may further comprise the step of:

using a blockchain client to obtain the result from the stack. The blockchain client may be a Bitcoin client. It may be adapted, arranged or configured to be able to read, return and/or obtain a value from the stack.

The method may further comprise the step of:

submitting the blockchain transaction (Tx2) and/or other blockchain transaction (Tx1) to the blockchain network.

The at least one data item is provided as metadata within the unlocking script (ULS1).

The result may be provided as metadata within the further unlocking script (ULS2).

The invention also comprises a corresponding system and apparatus. The invention may comprise a computer-implemented system arranged and configured to implement any preceding method step(s) mentioned above or substantially as described hereafter.

These and other aspects of the present invention will be apparent from and elucidated with reference to, the embodiment described herein. An embodiment of the present invention will now be described, by way of example only, and with reference to the accompany drawings, in which:

FIG. 1 illustrates the chain of transactions and the sequential steps involved in a multiple inputs/outputs approach according to a first embodiment of the invention.

FIG. 2 shows Transaction 1 (Tx1) according to an illustrative version of a first embodiment of the invention.

FIG. 3 shows Transaction 2 (Tx2) according to an illustrative version of a first embodiment of the invention.

FIG. 4 shows an illustrative chain of transactions according to an illustrative version of embodiment 2

FIGS. 5 to 8 show transactions 1, 2, 3, and 4 in accordance with an illustrative version of embodiment 2.

FIGS. 9a and 9b show illustrations of how an example version of the invention may be provided in accordance with embodiment 1.

FIG. 10 shows a simple illustration of a blockchain client being used to obtain an item left on top of the stack.

ILLUSTRATIVE EMBODIMENTS OF THE INVENTION

In the following examples, we shall use Bitcoin as our illustrative blockchain implementation and protocol, because it is the most widely known. This is for the purposes of illustration only and it should be noted that the invention is not limited in this regard. Other blockchain implementations will also fall within the scope of the invention.

In order to prevent deployment of DoS (Denial of Service) attacks, the default Bitcoin client sets a limit on the maximum number of bytes and op_codes that can be include in a valid script. As it stands at the priority date of the present application, this limit is 10,000 bytes and 201 op codes. Any script comprising more than 201 op-codes or 10,000 bytes will not be valid. While imposed for worthwhile reasons, this restriction hampers the development of more sophisticated script functionality and, therefore, the complexity of the technical solutions that can be designed to operate in conjunction with blockchain technology.

The present invention provides two techniques (embodiments) which enable users to split blockchain scripts into multiple inputs/outputs via the use of two or more blockchain transactions. Both embodiments may rely on the capability of automated computing agents (or "bots") which are configured to:

read the state of the stack,
  propagate i.e. communicate the result(s) of executed script(s) to the input(s) of unspent transaction output(s),
  split up large complex scripts into multiple smaller, simple units.

It should be noted that in some blockchain implementations, such as Bitcoin, a custom client may be required to enable the state of the stack to be read after a script has terminated, as the default Bitcoin client does not provide access to this item of information. The stack is represented as a list in a .cpp file, which is included in the bitcoin core program. By inserting a few lines of code into the class which emulates the stack behaviour, it is possible to obtain and return information contained in the list. The information can then be passed on for use by another computing resource and/or in another computation. This is shown in FIG. 10.

The propagation of the result of the executed script does not require any automation and could be performed manually (at least in principle). However, in a typical implementation it is expected that external systems such as compilers would handle the automation of the operations involved in splitting complex scripts.

Advantageously, no modification of the Bitcoin protocol is required by the present invention. In other words, while a custom client may be needed to prepare the transaction(s), once the transactions have been broadcast, all nodes of the Bitcoin network will be able to validate them.

Thus, in accordance with (all versions of) the invention, the underlying concept is to split the script into several chunks or functional parts, and to use the output of a chunk as the input of the next chunk. This is an important deviation from the prior art. It allows the blockchain to be used for ever complex tasks and computations while preserving the limit on script size, and provides a novel architecture for the distributed execution of computational processes.

However, it must be kept in mind that the ultimate outcome of the execution of a script is binary, i.e. either the transaction is marked invalid or it is marked valid (assuming that it satisfies also the other requirements). Therefore, in order to "connect" the outputs of one chunk of computation with the inputs of the next chunk of computation one must use to a non-reference client that can access the values on the stack and reuse them, as explained above.

We start with the following simple example:

$$x+y>3$$

which can be written in terms of OP codes in the following way:

*OP_<x>OP_<y>OP_ADD OP_3 OP_GREATERTHAN*

We split this into the following two chunks:

$$z=x+y$$

$$z>3$$

In accordance with a first approach, a solution could be adopted as now described.

Alice prepares Tx1 as follows:
Tx1
In0:
amount: A+<dust>+tf
ref: . . .
unlocked by: . . .
Out1:
amount: <dust>
locked by: OP_ADD OP_SWAP<Bob's pubKey>OP_SWAP OP_CHECKSIG OP_DROP
Out2:
amount: A
locked by: OP_3 OP_GREATERTHAN OP_SWAP<Bob's pubKey>OP_DROP Now Bob begins to prepare Tx2 in the following way:
Tx2
In0:
amount: tf
ref: . . .
unlocked by: . . .
In1:
amount: <dust>
ref: Tx1:Out1
unlocked by: <Bob's signature>OP_2 OP_3
Out0:
amount: <dust>
locked by: . . .

Bob will now sign the transaction, validate it, and (use the customised client to) read from the stack the output of the unlocking script of Tx2:In1 chained with the unlocking script of Tx1:Out1.

He will then proceed to alter Tx2 by adding the following input and output:
In2:
amount: A
ref: Tx1:Out2
unlocked by: <Bob's signature>OP_5
Out1:
amount: A
locked by: . . .

where obviously OP_5 is the result of the first chunk of the computation. Also in this case, one could use multi-signatures to prevent Bob from broadcasting a transaction within which OP_5 is replaced with something else. This approach has the advantage that a large number of chunks (up to the limit on the number of inputs and outputs in a transaction) can be chained using only two transactions. Therefore, complex functionality and computation can be performed in an efficient manner, requiring only two transactions to be validated and mined by the blockchain network, and using minimal storage requirements on the blockchain.

In accordance with an alternative approach the following steps could be taken.

The first transaction Tx1 is prepared and jointly signed by all the owners of the inputs.

Inputs are sent to Alice's public key using the following locking script:

*OP_ADD OP_SWAP<Alice's pubKey>OP_SWAP OP_CHECKSIG OP_DROP*

Tx1
In:
amount: A+tf
ref: . . .
unlocked by: . . .
Out1:
amount: A
locked by: OP_ADD OP_SWAP<Alice's pubKey>OP_SWAP OP_CHECKSIG OP_DROP Alice will now prepare Tx2 in the following way:
Tx2
In1:
amount: 2*<dust>+tf
ref: . . .
unlocked by: . . .
In2:
amount: A
ref: Tx1:Out1
unlocked by: <Alice's signature>OP_2 OP_3
Out1:
amount: <dust>
locked by: . . .

where Tx2:In2 will be now signed with the flag SIGHASH_NONE, so that other outputs can be added. As known in the art, SIGHASH_NONE is a Bitcoin signature hash type which signs only inputs. Therefore, when SIGHASH_NONE is used, anyone is able to modify the outputs in any manner that they choose.

Tx2:In1 presumably references Alice's funds and can be unlocked with SIGHASH_SINGLE so that, again, other outputs can be added. In the current form, the transaction will transfer amount A as transaction fees. However, Alice does not broadcast the transaction in the current form, but simply verifies it locally. In the verification process the unlocking script of Tx2:In2 will be executed together with the locking script of Tx1:Out:

---

<Alice's signature> OP_2 OP_3 OP_ADD OP_SWAP <Alice's pubKey> OP_SWAP OP_CHECKSIG OP_DROP

--- and at the end of the execution of the stack the remaining result will be 5, i.e. the result of the first chunk of computation. Alice's custom Bitcoin client will now save or record the result of the first chunk of computation and modify Tx2 by adding the following two outputs:

Out2:
amount: A
locked by: OP_3 OP_GREATERTHAN OP_SWAP<Bob's pubKey>OP_DROP
Out3:
amount: <dust>
locked by: OP_RETURN OP_5 but she will sign Tx2's inputs again, this time with the usual flag SIGHASH_ALL, so that now none of the outputs of the transaction can be modified. Bob can now complete the computation by reading the data stored in Out3 after OP_RETURN.

As known in the art, OP_RETURN is a Bitcoin OP_CODE which can be used to mark a transaction output (TxO) as invalid. Any data provided after OP_RETURN is ignored in respect of Bitcoin payments, and thus OP_RETURN has been used in the prior art as a mechanism for conveying non-payment related data via the blockchain.

Bob now prepares the following transaction:
Tx3
In:
amount: A
ref: Tx2:Out2
unlocked by: <Bob's signature>OP_5
Out: . . .

In principle, after OP_RETURN one could store a hash indexed in a DHT, so that arbitrarily long intermediate results can be passed between transactions. Obviously, in this example Alice trusts that Bob will prepare Tx3 as above, so that the computation can be completed successfully. A simple extension could require that Tx2:Out2 is signed by both Alice and Bob, so that Alice can verify that Bob has prepared the correct transaction. However, Bob could indefinitely delay the execution by refusing either to prepare the transaction or to sign it. Alice could also prepare Tx3, send it to Bob, and avoid to store data after OP_RETURN. It is noted that this approach requires one to wait for confirmation that each chunk of computation is in the blockchain.

Detailed examples of these two implementations of the underlying technique are provided below, and in reference to the accompanying figures. The following description is organized as follows:
"Embodiment 1" describes the first approach that uses only two transactions; multiple inputs and outputs are manipulated
"Embodiment 2" describes the alternative approach which "links" or chains multiple transactions to achieve the same technical effect. It is worth noting that combinations of the two approaches are also possible.

To illustrate the use of both embodiments, we now consider the following example which evaluates a function $f(x, y, z)$ defined as follows $$f(x,y,z)=(x \cdot y+z) \cdot x$$

We (or the compiler) express $f(x,y,z)$ as a sum of simple functions $$g_1(x,y)=x \cdot y$$

$$g_2(g_1(x,y),z)=g_1(x,y)+z$$

$$f(g_2(g_1(x,y),z),x)=g_2(g_1(x,y),z) \cdot x$$

In both embodiments, the variables x, y, and z, which represent the arguments of $g_1$ and $g_2$, will be contained in transaction unlocking scripts, while the functions $g_1$ and $g_2$ themselves will be contained in locking scripts. Therefore, hereafter, we will use the terms "function" and "locking script" interchangeably. In particular, x and y will be in the script that unlocks the locking script containing $g_1$. Similarly, $g_2(x,y)$ and z will be in the script that unlocks the locking script containing $g_2$.

In the subsequent section of this paper, the example we use include the op_codes OP_ADD and PrO_MULT. These identifiers represent the arithmetic operations addition (+) and multiplication (·) respectively. The op_codes OP_X, OP_Y, and OP_Z represent the variables x, y, and z. The symbols $G_1$ and $G_2$ represent the values at the top of the stack after the locking scripts corresponding to $g_1$ and $g_2$ will have been unlocked. OP_ADD is an op_code which forms part of the Bitcoin script language. We use the term "PrO_MULT", short for "primitive operator" to refer to an operation which can be executed to perform a multiplication operation. In the current version of Bitcoin, the op_codes for multiplication (such as OP_MUL, OP_2MUL) are disabled and so PrO_MULT could be a custom-defined operation to provide that currently disabled functionality. Of course, if the OP_MUL etc opcodes are re-enabled then these could be used instead. Thus, the present invention can be used solely with functions that use standard (enabled) opcodes, and the implementation details of custom-built operators are not part of, or relevant to, the present invention. Therefore, details relating to how PrO_MULT could be implemented are not necessary to the understanding of the present invention, and have not been included herein for the sake of clarity.

The example presented herein corresponds to the execution of a very simple smart contract in which funds are transferred from Alice to Bob, conditional on the successful execution of a long script. The script inputs are provided by Bob, and one can envisage two possible malicious behaviours. Firstly, Bob might provide incorrect inputs such that the script executes successfully and the funds are transferred to him. However, when the transaction(s) is/are stored in the blockchain, the inputs become publicly available allowing Alice to dispute the contract. Secondly, if Bob has any reason to refuse the transfer from Alice, he might decide to stall the transaction indefinitely, therefore preventing the execution of the contract. In the most straightforward scenario, Alice must simply trust that Bob will not stall the execution of the contract and that he will provide the correct inputs. Additional security mechanisms may be utilised in conjunction with the inventive concept to enhance security.

Embodiment 1: Splitting Scripts into Multiple Inputs and Outputs

FIGS. 1, 9a and 9b illustrate the chain of transactions and the sequential steps involved in a multiple inputs/outputs approach of embodiment 1. Tx1 contains a set of Unspent Transaction Outputs (UTXOs) that will be consumed by Tx2. The construction of Tx2 proceeds incrementally, step by step. At each phase, an (automated software) agent presents an unlocking script to one UTXO of Tx1. The agent validates Tx2, reads the value(s) on top of the stack, and prepares a new unlocking script. The automated generation of blockchain transactions and scripts is known in the art and therefore not explained herein.

The agent may use the information obtained from the stack in the previous step (or from earlier steps), and presents this new unlocking script to another UTXO contained within Tx1. Tx2 is broadcasted when all the necessary steps are accomplished for the present task.

Advantageously, this technique decouples the functions contained in the locking scripts of Tx1 from the arguments contained in the unlocking scripts provided by Tx2. Functions become immutable once Tx1 has been added to the blockchain and verified. In addition, at this stage, the function arguments (inputs) may even be unknown. They are revealed only later, when Tx2 is prepared. This may be advantageous and provide enhanced security.

The sequence of steps for embodiment 1 is shown in FIG. 1, FIGS. 9a and 9b and can be described as follows:
Step 0: Alice submits transaction 1 (as shown in FIG. 1) to the Bitcoin network.
Step 1: Bob prepares an initial version of transaction 2
Step 3: Bob presents <Bob's signature><OP_X><OP_Y><Redeem script 1> to output0. Bob validates transaction 2, reads the value $G_1$ on top of the stack, but does not broadcast transaction 2.
Step 4: Bob presents <Bob's signature><$G_1$><OP_Z><Redeem script 2> to output1. Bob validates transaction 2, reads the value $G_2$ on top of the stack, but does not broadcast transaction 2.
Step 5: Bob presents <Bob's signature><$G_2$><OP_X><Redeem script 3> to output2. Bob validates transaction 2 and broadcasts it.

For the sake of simplicity, we do not provide extensive details regarding Tx1's inputs and Tx2's output(s). FIG. 2 shows Transaction 1 (Tx1). FIG. 3 shows transaction 2 (Tx2).

Embodiment 2: Splitting Scripts in Multiple Transactions

The second embodiment uses blockchain transactions to compose functions (see FIG. 4). This approach is similar in principle to the previous embodiment. However, during the validation phase, the agent reads the value(s) on top of the stack, and adds it/them after an OP_RETURN as explained above.

FIGS. 5 to 8 show transactions 1, 2, 3, and 4 in accordance with an illustrative version of embodiment 2.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:
1. A method of using a plurality of blockchain transactions to execute a computer-implemented task, comprising the steps:
using an unlocking script (ULS1) associated with a first input (In1) in a blockchain transaction (Tx2) to present at least one data item to a locking script (LS1) of another transaction (Tx1) so as to provide a result on a stack;
amending the blockchain transaction (Tx2) to include a second input (In2);
generating a further unlocking script (ULS2) associated with the second input (In2), the further unlocking script (ULS2) comprising the result from the stack, wherein the unlocking script (ULS1) and the further unlocking script (ULS2) are provided in association with different inputs (In1 In2) within the same blockchain transaction (Tx2) and wherein the result is provided as metadata within the further unlocking script (ULS2); and
presenting the further unlocking script (ULS2) to a further locking script (LS2) such that the result from the stack is provided as input to the further locking script (LS2), wherein the locking script (LS1) and the further locking script (LS2) are provided in association with different outputs within the same blockchain transaction (Tx1) and wherein:

the plurality of blockchain transactions are for a blockchain, the blockchain being a consensus-based, distributed, electronic ledger; and/or the blockchain is the Bitcoin blockchain; and/or one, some or all of the transactions are Bitcoin transactions; and/or the method is arranged for execution on the Bitcoin blockchain.

2. A method according to claim 1, and further comprising amending the blockchain transaction (Tx2) to include a third input (In3).

3. A method according to claim 1, and further comprising the step of:

using the at least one data item in the execution of a calculation or sequence of instructions provided within the locking script (LS1).

4. A method according to claim 1, and further comprising the step of:

using the result provided on the stack in the execution of a calculation or sequence of instructions provided within the further locking script (LS2).

5. A method according to claim 1, and further comprising the step of:

obtaining the result from the stack.

6. A method according to claim 1, and further comprising the step of:

validating the blockchain transaction (Tx2) and/or the other transaction (Tx1) to generate the result on the stack.

7. A method according to claim 1, wherein:

the step of presenting the further unlocking script (ULS2) to a further locking script (LS2) provides a further result on the stack, or on a different stack.

8. A method according to claim 1, and further comprising the step of:

using a blockchain client to obtain the result from the stack.

9. A method according to claim 8, wherein:

the blockchain client is a Bitcoin client.

10. A method according to claim 1, and further comprising the step of:

submitting the blockchain transaction (Tx2) and/or other blockchain transaction (Tx1) to a blockchain network.

11. A method according to claim 1, wherein:

the at least one data item is provided as metadata within the unlocking script (ULS1).

12. A method according to claim 1, wherein:

the plurality of blockchain transactions are for a blockchain, the blockchain being a consensus-based, distributed, electronic ledger; and/or the blockchain is the Bitcoin blockchain; and/or one, some or all of the transactions are Bitcoin transactions; and/or the method is arranged for execution on the Bitcoin blockchain.

13. A method according to claim 1, and further comprising the step of:

using the method to compute a final result, and using the final result to control a process performed off the blockchain.

14. A computer-implemented system arranged and configured to perform at least the following operations:

using an unlocking script (ULS1) associated with a first input (In1) in a blockchain transaction (Tx2) to present at least one data item to a locking script (LS1) of another transaction (Tx1) so as to provide a result on a stack;

amending the blockchain transaction (Tx2) to include a second input (In2);

generating a further unlocking script (ULS2) associated with the second input (In2), the further unlocking script (ULS2) comprising the result from the stack, wherein the unlocking script (ULS1) and the further unlocking script (ULS2) are provided in association with different inputs (In1 In2) within the same blockchain transaction (Tx2) and wherein the result is provided as metadata within the further unlocking script (ULS2); and presenting the further unlocking script (ULS2) to a further locking script (LS2) such that the result from the stack is provided as input to the further locking script (LS2), wherein the locking script (LS1) and the further locking script (LS2) are provided in association with different outputs within the same blockchain transaction (Tx1) and wherein:

the plurality of blockchain transactions are for a blockchain, the blockchain being a consensus-based, distributed, electronic ledger; and/or the blockchain is the Bitcoin blockchain; and/or one, some or all of the transactions are Bitcoin transactions; and/or the method is arranged for execution on the Bitcoin blockchain.

15. The computer-implemented system of claim 14, wherein the operations further comprise amending the blockchain transaction (Tx2) to include a third input (In3).

16. The computer-implemented system of claim 14, wherein the operations further comprise:

using the at least one data item in the execution of a calculation or sequence of instructions provided within the locking script (LS1).

17. The computer-implemented system of claim 14, wherein the operations further comprise using the result provided on the stack in the execution of a calculation or sequence of instructions provided within the further locking script (LS2).

18. The computer-implemented system of claim 14, wherein the operations further comprise obtaining the result from the stack.

19. The computer-implemented system of claim 14, wherein the operations further comprise validating the blockchain transaction (Tx2) and/or the other transaction (Tx1) to generate the result on the stack.

20. The computer-implemented system of claim 14, wherein presenting the further unlocking script (ULS2) to a further locking script (LS2) provides a further result on the stack, or on a different stack.

* * * * *